Patented June 18, 1929.

1,717,561

UNITED STATES PATENT OFFICE.

NEVIL MONROE HOPKINS, OF NEW YORK, N. Y., ASSIGNOR TO BURNOT FIREPROOFING PRODUCTS, INC., OF NEW YORK, N. Y., A CORPORATION OF NEW YORK.

COATED ARTICLE.

No Drawing.    Application filed January 21, 1924.   Serial No. 687,624.

This invention relates to a fire and weather resisting paint and method of producing the same, and has for its object to improve the products and procedures heretofore proposed.

With these and other objects in view the invention consists in the novel composition of matter constituting the paint, and in the novel steps and combinations of steps constituting the method all as will be more fully hereinafter disclosed and particularly pointed out in the claims.

In order that the precise invention may be the more clearly understood it is said:—It is well known that fire and weather resisting paints have been heretofore proposed, but all of them have been more or less unsatisfactory due to the fact that the fire resisting constituents are usually soluble in water, and therefore, when exposed to the weather for a sufficient time they are apt to lose their efficiency as fire resistants. This result ensues even though the fire resistant coating is overlaid or covered by one or more weather resistant coats, for due to the effects of the rain, sunshine, heat, etc., a greater or less amount of cracking or what is termed as "livering" eventually takes place in the outer coatings, and these cracks admit to the priming or under coat, a greater or less quantity of water which destroys or lessens the fire resisting qualities of said primary or first coat. In addition to the foregoing objections, it often happens that the constituents of the fire resisting and the weather resisting coats are capable of chemically reacting on each other under conditions of use, and thus destroy the efficiency of one or the other coats. Also, it sometimes happens that the coefficients of expansion and contraction of the two coats under summer and winter temperatures are such as to crack one or both of the same, and thus freely admit water to the soluble fire resisting constituents and cause a rapid deterioration of the latter.

By this invention, I overcome the foregoing objections by proceeding as follows:—For the fire resisting coat I employ a high percentage of borax or sodium biborate, which is only sparingly soluble in water at ordinary temperatures. As a vehicle for the sodium biborate, I employ linseed oil, and to prevent the latter from being saponified by the borax and thus rendered soluble, I employ a linseed oil having an acid value sufficient to prevent said saponification. In practice I find a linseed oil of from 10—15 acid value suitable and that this is a well known article of commerce. Borax has a high affinity for the cellulose constituents of wood, and therefore a priming coat of paint made up as above disclosed sticks to wood with great tenacity.

As a weather resisting covering or finishing coat of paint for this priming coat made of borax, I prefer to employ a mixture of basic carbonate of lead, basic sulphate of lead, zinc oxide and any desired coloring constituent. As a vehicle for this second or weather resisting coat I also employ linseed oil, and to prevent the saponification of the latter due to the seepage of the borax therein said borax forming the priming coat, and to render the outer coating insoluble in water, I choose such an oil as will prevent this saponification. In practice I find an oil having from 5 to 10 acid value is suitable and that oil is likewise a well known article of commerce. The use of a percentage of basic lead sulphate with the basic lead carbonate, enables the fire resisting qualities of the weather resisting coating to be increased, for unlike basic lead carbonate, basic lead sulphate does not reduce, in the presence of red hot carbon to metallic globules, and thus permit the fire to extend through the coat to the combustible material below.

The greater the percentage of borax in the primer or fire resisting coat, the more efficient it will be as a fire resistant, but I find excellent results are obtained when percentages between 60% to 90% or higher are employed, on account of the very great tenacity with which borax coatings grip wood surfaces. When the borax is to be admixed with other substances I prefer to employ titanium oxide, which gives a hiding power to the borax, but other pigments may also be used, such for example, as zinc oxide, lithopone, white lead, (either basic carbonate, or basic sulphate), etc. In some instances to the linseed oil vehicle a small quantity of turpentine, or of a mineral oil such as kerosene may be added to increase the penetration of said vehicle into the wood, and to the mixture it is sometimes desirable to add a japan drier.

It is found that when weather resisting and fire resistaing coats of paint are prepared as above disclosed they have substantially the same coefficients of expansion and contraction under weather conditions of summer and winter and that cracks do not develop to such an extent as will impair the fire resistant efficiency of the priming coat. Therefore no objectionable deterioration goes on between the constituents of the paint. On the other hand, the outer coat resists the weather, and is insoluble in water, while when fire is applied thereto the borax of the inner coat swells up into blister like masses forming heat insulating barriers. If the flame is persistent these barriers melt down to form a fluid enamel like, or glass like coating which still serves to insulate the combustible material from the oxygen of the air.

In carrying out this invention, in practice, as a specific example, I prefer to make up the priming coat as follows:—

| | Per cent. |
|---|---|
| Sodium bi-borate (or borax) | 90 |
| Titanium oxide (titanox) | 10 |

As a vehicle for this priming coat I prefer to employ:—

| | Per cent. |
|---|---|
| Refined linseed oil, raw, acid value 10–15 | 75 |
| Turpentine, mineral spirits, or a mixture of these | 15 |
| Japan drier | 5 |
| Benzol | 5 |

In making up the finishing or outer covering coat, I prefer to employ:—

| | Per cent. |
|---|---|
| Zinc oxide | 30 |
| Lead sulphate | 20 |
| Lead carbonate | 40 |
| Magnesium silicate | 10 |
| | 100 |

As a vehicle for this outer or finishing coat, I prefer to employ:—

| | Per cent. |
|---|---|
| Linseed oil, raw, acid value 5–10 | 85 |
| Benzol | 5 |
| Japan drier | 6 |
| Mineral spirit or turpentine | 4 |
| | 100 |

It will now be clear that by proceeding as above disclosed I am enabled on the one hand to reap the advantages of alkaline constituents of paint which tenaciously stick to wood, while on the other hand, I avoid the disadvantages possessed by these constituents in saponifying the oil vehicles employed and thus destroying the weather resisting qualities of the paint, while I do not impair the great fire resisting qualities that are inherent in the borax.

It will be understood that the priming or fire resisting coat is always in use to be covered by the weather resisting or covering coat if the best results are to be attained, although each coat may in some cases be used alone.

It is obvious that those skilled in the art may vary the details of procedure without departing from the spirit of the invention and therefore, I do not wish to be limited to the above disclosure except as may be required by the claims.

What is claimed is:—

1. An object having a protective surface coating including a primary coating of fire resistant paint having in its composition more than 60% of its pigments in the form of borax and a linseed oil vehicle therefor having an acid value sufficient to prevent the borax from saponifying the oil, and an overlying coating of weather resistant paint including in its composition as pigments lead carbonate admixed with lead sulphate and zinc oxide and a linseed oil vehicle.

2. An object having a protective surface coating including a primary coating of fire resistant paint having in its composition more than 70% of its pigments in the form of borax and a linseed oil vehicle therefor, and an overlying coating of weather resistant paint including in its composition as pigments lead carbonate, lead sulphate and zinc oxide and linseed oil vehicle for said pigments having an acid value sufficient to prevent saponification of said oil when said weather resistant coating is applied over said fire resistant coating.

3. An object having a protective surface coating including a primary coating of fire resistant paint having in its pigment composition more than 80% borax and a linseed oil vehicle, and an overlying coating of weather resistant paint whose pigment content is more than 10% each of lead carbonate, lead sulphate and zinc oxide admixed with a linseed oil vehicle.

4. An object having a protective surface coating including a primary coating of fire resistant paint having in its pigment composition more than 85% borax and more than 5% titanium oxide in a linseed oil vehicle, and an overlying coating of weather resistant paint including in its pigment composition more than 15% each of lead carbonate, lead sulphate and zinc oxide in a linseed oil vehicle.

5. An object having a protective surface coating including a primary coating of fire resistant paint having in its composition a pigment content of 90% borax and 10% titanium oxide in a linseed oil vehicle and an overlying coating of weather resistant paint including in its composition a pigment content of 40% lead carbonate, 20% lead sulphate and 30% zinc oxide in a linseed oil vehicle.

6. The herein described new fire resisting paint including a pigment content of more than 80% borax, and more than 5% titanium oxide mixed with linseed oil having an acid value sufficient to prevent said borax from saponifying said oil.

7. An object having a protective surface coating, including a fire-retarding coating containing borax, and a weather-resisting coating overlying said fire-retarding coating and including linseed oil having an acid value to resist saponification with the borax of the fire-retarding coating.

8. An object having a protective surface coating, including a fire-retarding coating containing borax and linseed oil of acid value to resist saponification with the borax, and a weather resisting coating overlying said fire-retarding coating and including linseed oil of acid value to resist saponification with the borax of said fire-retarding coating.

In testimony whereof I affix my signature.

NEVIL MONROE HOPKINS.